United States Patent [19]

Ferguson et al.

[11] Patent Number: 5,579,380
[45] Date of Patent: Nov. 26, 1996

[54] METHOD AND APPARATUS FOR PROCESSING TELEPHONE CALLS FROM ONE LINE TO ANOTHER

[75] Inventors: Ernie Ferguson, Cold Water, Mich.; Mark Bradley, Canyon Country, Calif.; Thomas G. Hurley, Jr., Memphis, Tenn.

[73] Assignee: Connection Laboratories, Inc., Hernando, Miss.

[21] Appl. No.: 328,474

[22] Filed: Oct. 25, 1994

[51] Int. Cl.⁶ .............................. H04M 1/00; H04M 3/42
[52] U.S. Cl. .................... 379/165; 379/164; 379/157; 379/215
[58] Field of Search .................................. 379/156, 157, 379/158, 162, 164, 165, 201, 202, 210, 211, 212, 215

[56] References Cited

U.S. PATENT DOCUMENTS 4,791,662  12/1988  Ahnen et al. ........................ 379/158
4,813,080   3/1989  Humphreys et al. ............... 379/212 X
5,251,254  10/1993  Tanigawa .............................. 379/165
5,392,341   2/1995  Wilkinson et al. ..................... 379/210

Primary Examiner—Wellington Chin
Assistant Examiner—Paul Loomis
Attorney, Agent, or Firm—Clifton Ted Hunt

[57] ABSTRACT

A method and apparatus is provided that enables a telephone subscriber to automatically transfer ringing telephone calls from the subscriber's main published line to another line in the subscriber's telephone system without having to manually dial the sequence of the telephone company's pickup code, such as *8. The subscriber thereby has some of the conveniences of the rollover feature, but pays the telephone company only the relatively inexpensive cost of call pickup service.

5 Claims, 3 Drawing Sheets

① Incoming Call rings Line 1
② Subscriber hears Line 1 ringing and manually dials *8
③ Call Pickup Feature in CO processes call from Line 1 to Line 2.

5,579,380

METHOD AND APPARATUS FOR PROCESSING TELEPHONE CALLS FROM ONE LINE TO ANOTHER

FIELD OF THE INVENTION

This invention relates to telephone systems of telephone subscribers having at least two telephone lines (primarily key service units) and more particularly to a method and apparatus on the subscriber's premises to hunt and connect an available line to an incoming telephone call.

BACKGROUND OF THE INVENTION

Telephone companies have "roll-over" or hunting feature they offer to subscribers having two or more telephone lines. This service utilizes a conventional hunting feature available in the telephone company's central office (CO) switch to automatically process incoming calls from a subscriber's published line to an available line in the subscriber's system if the subscriber's published line is busy. Some telephone companies charge a monthly rate of as much as twenty to thirty five dollars for this service.

Telephone companies also have a "call pickup" feature they offer to subscribers having two or more telephone lines. The call pickup feature also utilizes the telephone switching system installed in the telephone company's central office, but the processing of incoming calls from a subscriber's published line to an available line in the subscriber's system is not automatic. In practice, a subscriber having the call pickup feature and hearing the published line (line 1) ringing can transfer or pickup the call on another line (line 2) in the subscriber's system by manually dialing *8 on line 2. The manual dialing of *8 activates the call pickup feature in the telephone switch in the CO which then processes the ringing call from the subscribers's line 1 to line 2.

The typical charge by a telephone company for call pickup service is one dollar each month. This cost is much less than what some of the telephone companies charge for the automatic rollover feature, but the inexpensive call pickup feature conventionally offered by telephone companies requires the subscriber to manually dial *8. That is much less convenient for the subscriber than the automatic, but sometimes expensive, rollover service.

SUMMARY OF THE INVENTION

It is the primary object of this invention to provide a method and apparatus that a telephone subscriber can use with the CO's call pickup feature to automatically transfer ringing telephone calls from the subscriber's main published line to another line in the subscriber's telephone system without having to manually dial the sequence of the telephone company's pickup code, such as *8. The subscriber thereby has some of the conveniences of the rollover feature, but pays the telephone company only the cost of call pickup service. However, the subscriber must have all telephone lines connected to the call pickup feature and in the same pickup group in the CO.

It is another object of the invention to provide apparatus that may be economically installed on the premises of a telephone subscriber having a telephone system with at least two telephone lines connected to -the call pickup feature in the CO. The subscriber's telephone system may be a key service unit (KSU) or a private branch exchange (PBX). The apparatus and method of this invention will efficiently and reliably facilitate processing of telephone calls that are ringing in on the subscriber's main published line to an available line in the subscriber's telephone system.

The invention will be described in connection with a telephone subscriber's KSU, but it is to be understood that reference to a KSU also includes a PBX throughout the specification and claims.

DETAILED DESCRIPTION OF THE INVENTION

General Information and Prior Art

Figure 1:
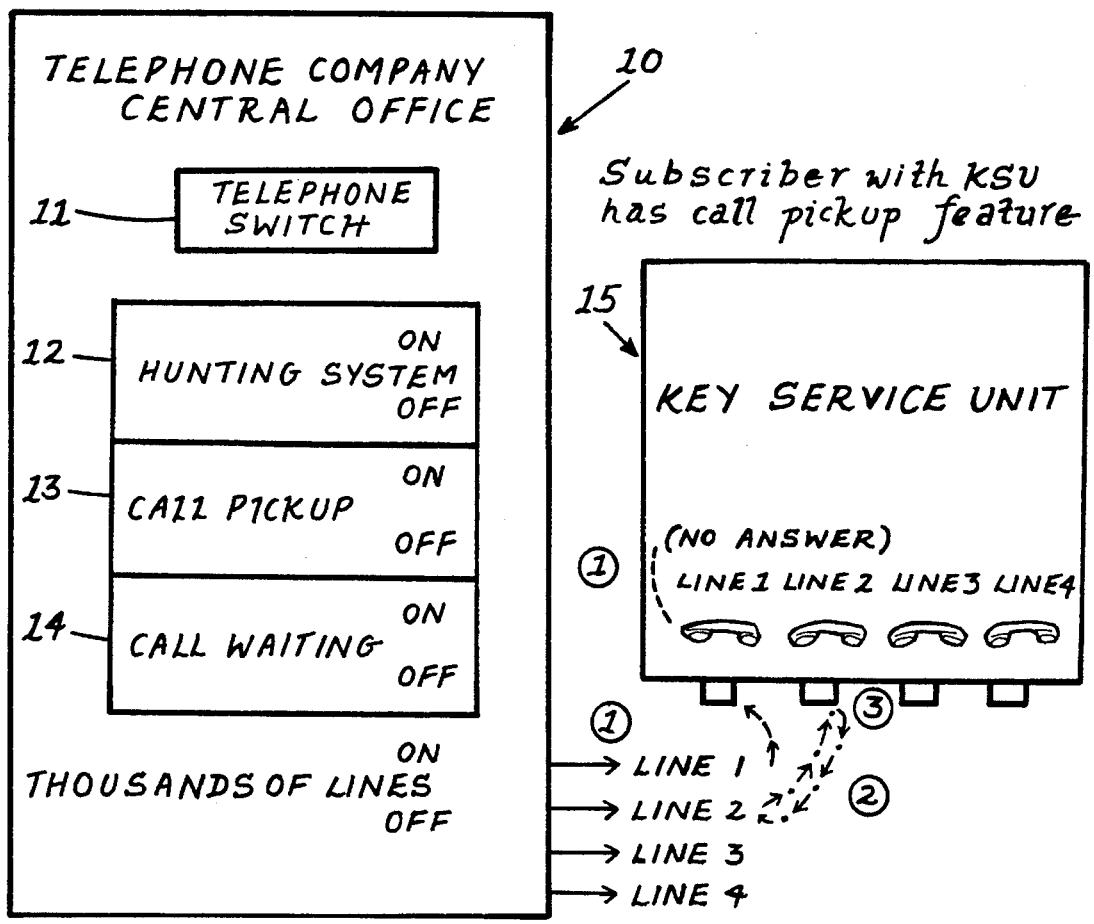
FIG. 1 is a block diagram illustrating the conventional (prior art) call pickup service offered by telephone companies to subscribers with key service units.
Figure 2:
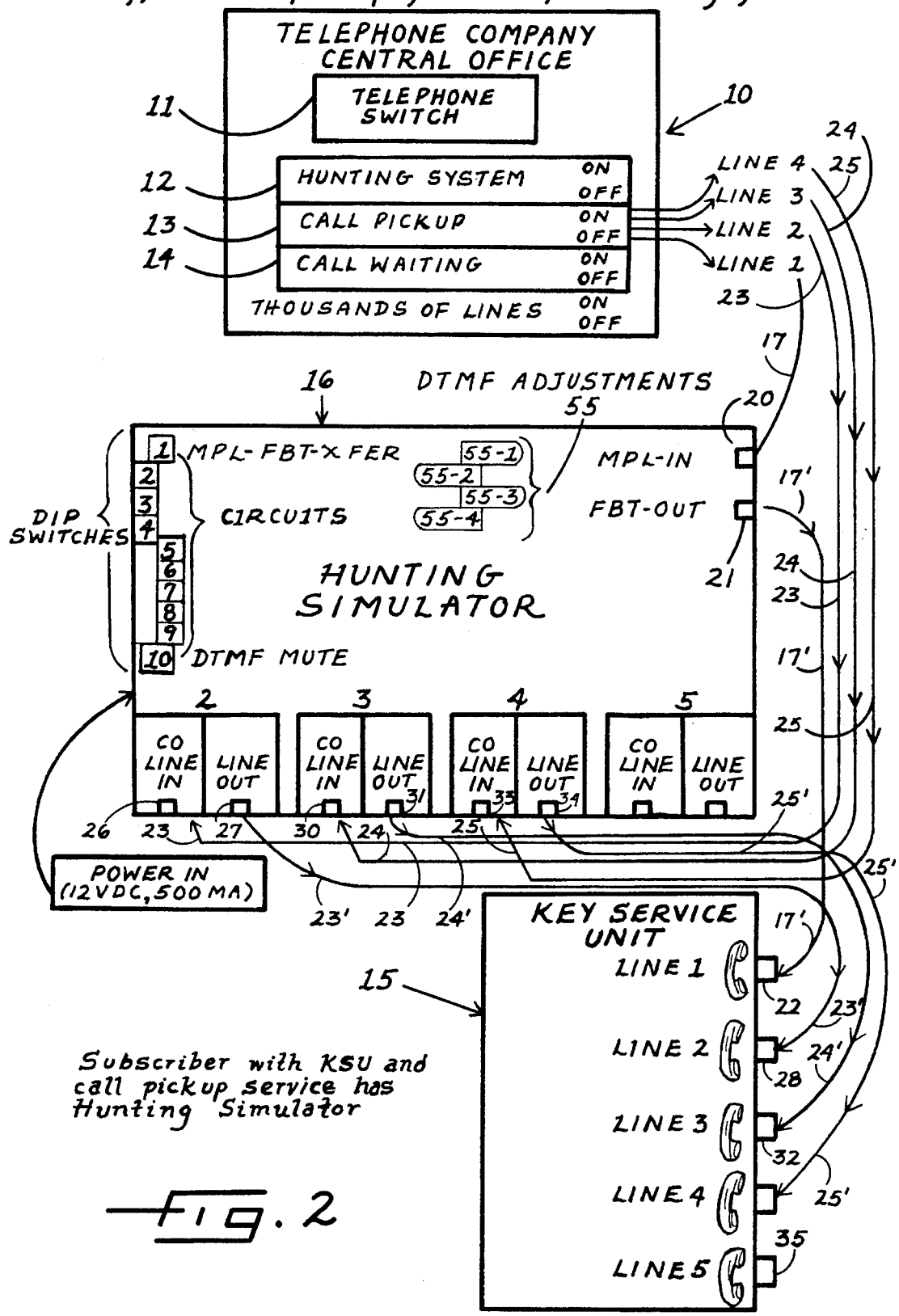
FIG. 2 is a block diagram showing a key service unit integrated with a conventional call pickup service and with the hunting simulator of this invention on the subscriber's premises.

Referring more specifically to the drawings, the central office (CO) of a telephone company is schematically and broadly indicated at 10. As indicated in FIGS. 1 and 2, the CO conventionally houses a telephone switch, schematically illustrated at 11, and a number of features, including a hunting or roll-over feature, call pickup, and call waiting, schematically indicated at 12, 13 and 14, respectively. Most of these features are optional and are available to telephone subscribers at varying monthly rates.

The hunting or roll-over feature in the CO offers the subscriber the convenience of automatically processing a dialed call to the subscriber's main published line to an available line in the subscriber's system if the main published line is busy. This convenience can cost as much as thirty five dollars per month.

The less expensive call pickup feature costs as little as one dollar per month, but the subscriber loses the convenience of the automatic roll-over feature by having to manually dial *8 to process a call from the main published line to another line.

FIG. 1 schematically illustrates the conventional steps to process a call ringing the main published line of a telephone subscriber having a key service unit (KSU), broadly indicated at 15, operably connected to the call pickup feature 13 at the CO 10.

With reference to the circled numbers in FIG. 1, when a caller dials the subscriber's main published line (Line 1), the CO rings the subscriber's Line 1. Somebody on the subscriber's premises, hearing Line 1 ringing, desires to answer the call on the subscriber's Line 2. The transfer of the call from Line 1 to Line 2 is initiated by the subscriber picking up a phone on Line 2 and manually dialing *8 (circled number 2 in FIG. 1). The manual dialing of *8 causes the call pickup feature in the CO to process the call to the subscriber's Line 2 (circled number 3 in FIG. 1).

The Hunting Simulator

FIG. 2 schematically illustrates a telephone subscriber's KSU 15 having a main published line 17 (MPL or Line 1) connected to the call pickup feature 13 at the CO 10 and to an apparatus known as a hunting simulator (HS), broadly indicated at 16. More specifically, the subscriber's MPL 17 extends from the call pickup feature 13 at the CO to an inlet port 20 on the HS 16 and is connected to the subscriber's KSU 15 by a line 17[1] extending from an outlet port 21 on the HS 16 to an inlet port 22 on the subscriber's KSU 15. The MPL feeds calls to the other available lines in the subscriber's system. Outbound use of the MPL is discouraged by the HS being programmed to delay outbound access to the MPL by a selected length of time, such as five seconds.

The hunting simulator 16 eliminates the need for costly roll-over (hunting) service from the CO. The HS recognizes an incoming call ringing on the subscriber's MPL 17 (Line 1) and redirects the ringing to an available line (Line 2 in the illustrated example) on the subscriber's telephone system. When a person picks up a telephone on Line 2, the HS recognizes the dial tone on Line 2 (the available line) and dials *8 to process the incoming call from Line 1 to Line 2.

The outlet port 21 for the MPL 17 on the HS 16 is labeled FBT in FIG. 2. The letters FBT signify "Full Busy Transfer", meaning that the HS 16 processes incoming calls on the subscriber's MPL to the MPL only when all of the subscriber's other lines are busy, and then only if the subscriber has adjusted the HS to process incoming calls to the MPL instead of providing an all lines busy status so the CO sends a "busy" signal to the caller.

The invention is operable with a key service unit (KSU) or private branch exchange (PBX) having any number of telephone lines. Three embodiments of the invention are currently being manufactured and sold. One embodiment handles up to five lines, another embodiment handles up to seven lines, and the third embodiment handles nine lines or less. The illustrated embodiment shows the KSU 15 equipped to handle a total of five telephone lines, the MPL 17 plus four other telephone lines. In the illustrated embodiment, the telephone subscriber has only four lines operably connected to the HS, the MPL 17 (Line 1) and three auxiliary lines, 23 (Line 2), 24 (Line 3), and 25 (Line 4).

As shown in FIG. 2, telephone line 23 (Line 2) extends from the call pickup feature 13 at the CO 10 to an inlet port 26 on the HS 16. Line 2 is connected to the subscriber's KSU 15 by a telephone line 23[1] extending from an outlet port 27 on the HS 16 to an inlet port 28 on the subscriber's KSU 15. Similarly, Line 3 (telephone line 24) extends from the call pickup feature 13 at the CO 10 to an inlet port 30 on the HS 16, and is connected to the subscriber's KSU 15 by a line 24[1] extending from an outlet port 31 on the HS 16 to an inlet port 32 on the subscriber's KSU 15. Line 4 (telephone line 25) extends from the call pickup feature 13 at the CO 10 to an inlet port 33 on the HS 16, and Line 4 is connected to the subscriber's KSU 15 by a telephone line 25[1] extending from an outlet port 34 on the HS 16 to an inlet port 35 on the subscriber's KSU 15. All of the telephone connections are made to and from the HS with standard modular connectors.

Note that all of the subscribers telephone lines or circuits are connected to the call pickup feature in the CO.

The Processing of Incoming Calls

Figure 3:
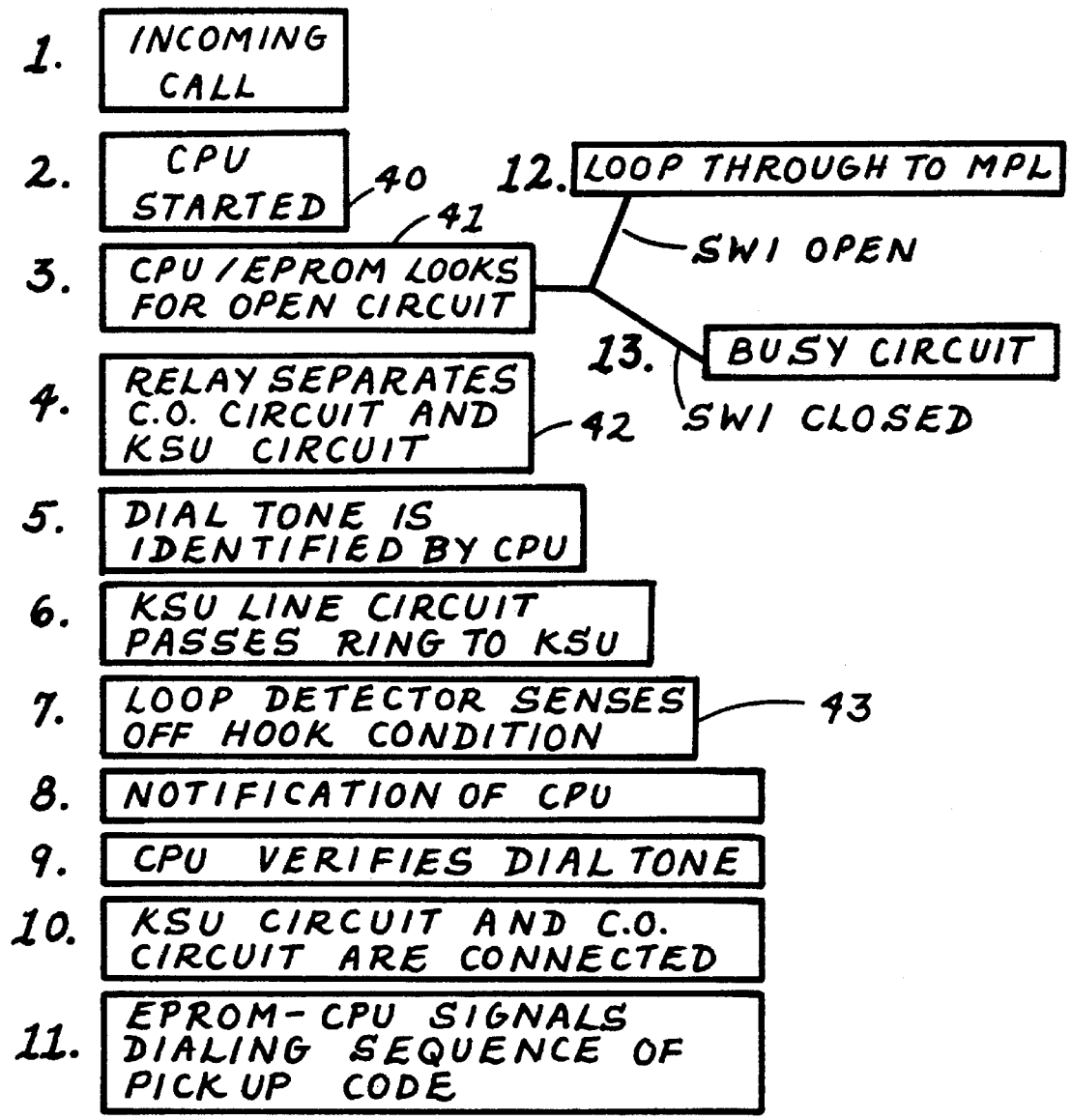
FIG. 3 is a flow chart illustrating the processing by the hunting simulator of a call received on the subscriber's main published line to an available line in the subscriber's telephone system.

The HS 16 is equipped with a central processing unit (CPU), an EPROM, a relay, and a loop detector, respectively and schematically illustrated at 40, 41, 42, and 43 in the flow chart of FIG. 3.

An incoming call on the subscriber's MPL 17 (Box 1 in FIG. 3) is recognized by the CPU 40 (Box 2). The CPU 40 and the EPROM 41 then look for an available line or open circuit (Box 3). If available lines or open circuits exist, the line to be selected is chosen in an installed order, proceeding from Box 4. The relay 42 in Box 4 separates the MPL 17 in the HS 16 into a CO circuit and a KSU circuit. Ringing is passed on to the KSU side of the circuit to notify the subscriber of an incoming call (Box 6). In Box 5, the dial tone is identified by the CPU 40 on the CO side of the circuit. On the KSU side of the circuit, a loop detector 43 (Box 7) waits to sense "answering" or an off hook condition.

When loop detector 43 senses off hook condition it notifies the CPU 40 of the off hook condition (Box 8). The CPU 40 verifies the dial tone (Box 9) and the KSU and CO circuits are then connected by a relay (Box 10). The EPROM-CPU signals the dialing sequence of the pickup code (*8) in Box 11 to complete the hunting simulator's processing of the incoming call on the subscriber's MPL to an available line in the subscriber's telephone system.

If, in Box 3, the CPU/EPROM was unable to find an available line or open circuit, the response to the incoming call on the MPL would not be shifted from Box 3 to Box 4 as described above, but would be shifted from Box 3 to either Box 12 or Box 13, depending on the subscriber's setting of dip switch 1. Dip switch 1 is one of a group of ten dip switches schematically illustrated in the upper left corner of the HS in FIG. 2, and collectively indicated at 50.

Dip Switches

Dip switch 1 controls use of the MPL when all working lines are busy. Stated differently, dip switch 1 controls inbound availability of the MPL 17. If dip switch 1 is open or enabled, as indicated in Box 12 of FIG. 3, the MPL 17 will be used for an inbound call when all other lines are in use. If dip switch 1 is closed or disabled, as indicated in Box 13 of FIG. 3, an off hook status will be provided to the CO so that a caller would heap a typical "busy" signal if all other lines were in use. With dip switch 1 closed, the "busy" status is terminated when a line other than the MPL becomes available. The MPL 17 will then be open to allow the processing of a new call to an available line or circuit.

Dip switches 2–9 enable and disable the telephone line circuits extending between the HS 16 and the KSU 15. In FIG. 2, dip switches 2–4 are in the open position or enabled to complete the circuits. Dip switches 5–9 are in the closed or disabled position because there are no telephone lines extending between the HS and the KSU for lines 5–9.

Dip switch 10 mutes the *8 tones. In the open or enabled position the mute function is enabled. In the closed or disabled position, the mute function is disabled and the *8 tones are audible. Audible tones are required for verification of DTMF timing adjustments.

DTMF Adjustments

A group of four switches, collectively indicated at 55, are accessible through an opening in the cover of the HS 16. The switches 55 are provided for adjustment of the dual tone multi-frequency (DTMF). The switches 55 are numbered 55-1, 55-2, 55-3, and 55-4 from top to bottom in the drawings. The switches 55 are off when moved or positioned to the left in the drawings and the switches are on when moved or positioned to the right in the drawings.

The DTMF tone must be audible to verify the timing with switches 55. This means that dip switch 10 must be in the closed or disabled position when adjusting the timing with switches 55.

The position of switch 55-1 controls the manual or automatic off hook delay before dial tone. If switch 55-1 is in the on or automatic position, the hunting simulator 16 proceeds to dial *8 immediately after recognizing off hook to answer the call. If switch 55-1 is in the off or manual position, switch 55-2 controls the predetermined off hook delay. The off hook delay is 1.25 seconds if switch 55-2 is in the off position, and if switch 55-2 is in the on position the off hook delay is 0.8 of a second. Switch 55-2 is not used when switch 55-1 is in the on or automatic position.

The positions of switches 55-3 and 55-4 control the dialing pulse duration of the *8. The hunting simulator grabs the dial tone and dials *8 to move the call onto Line 2, etc. Adjustments of the dialing pulse duration of the *8 allows the hunting simulator to be operated in a variety of different central office environments. In general, the smaller the delay and the faster the dialing, the sooner an incoming call is processed to an available line. However, some telephones, telephone switches, and central offices may require longer off hook delays and/or slower dialing pulses.

The following table shows the duration of the *8 pulses resulting from different settings of switches 55-3 and 55-4:

| *8 Pulses | 55-3 | | On | Off | On | Off |
|---|---|---|---|---|---|---|
| | 55-4 | | On | On | Off | Off |
| | MSecs | | 40 | 80 | 120 | 160 |
| Factory Default is: | 55-1 | On - Automatic Dial Tone Detection | | | | |
| | 55-2 | - Not Used When 55-1 is On | | | | |
| | 55-3 | On - 120 MSec *8 Pulses | | | | |
| | 55-4 | Off | | | | |

Conclusion

There is thus provided an apparatus and method of utilizing the inexpensive call pickup feature of a telephone company to obtain most of the advantages of the hunting or roll-over feature without the subscriber having to manually access the call pickup feature, as by dialing *8.

Although specific terms have been used in describing the invention, they have been used in a generic and descriptive sense only and not for the purpose of limitation. The scope of the invention is to be determined by the appended claims to invention, when read with reference to this specification and the applicable prior art.

We claim:

1. A telephone system having a call pickup feature in the central office of a telephone company and a key service unit (KSU) on a telephone subscriber's premises, the KSU having a main published line on one circuit and at least one additional line on another circuit and all of the operable circuits in the subscriber's KSU being operably connected to the call pickup feature and in the same pickup group wherein the call pickup feature is accessible by the subscriber signaling the dialing sequence of the pickup code such as *8 to the central office, wherein the improvement comprises:

(a) an apparatus on the subscriber's premises, said apparatus including:

(i) means for connecting the circuit for the subscriber's main published line from the telephone company first to the apparatus and then to the KSU;

(ii) means for connecting the circuits of the subscriber's other operable telephone lines from the telephone company first to the apparatus and then to the KSU;

(iii) means for receiving an incoming call to the subscriber's main published line; and (iv) means for selectively processing an incoming call to an available additional line or if there is no available additional line to either the main published line or to send a "busy" signal to the caller, wherein the means for selectively processing an incoming call to either the main published line or to send a "busy" signal to the caller if there is no available additional line comprises a dip switch and a CPU in the apparatus, the dip switch being operatively connected to the CPU and the CPU being programmed to process the incoming call to the main published line if the dip switch is open and to send a "busy" signal to the caller if the dip switch is closed.

2. A telephone system responding to a dual tone multi-frequency (DTMF) and having a call pickup feature in the central office of a telephone company and a key service unit (KSU) on a telephone subscriber's premises, the KSU having a main published line on one circuit and at least one additional line on another circuit and all of the operable circuits in the subscriber's KSU being operably connected to the call pickup feature and in the same pickup group wherein the call pickup feature is accessible by the subscriber signaling the dialing sequence of the pickup code such as *8 to the central office, wherein the improvement comprises:

(a) an apparatus on the subscriber's premises, said apparatus including:

(i) means for connecting the circuit for the subscriber's main published line from the telephone company first to the apparatus and then to the KSU;

(ii) means for connecting the circuits of the subscriber's other operable telephone lines from the telephone company first to the apparatus and then to the KSU;

(iii) means for receiving an incoming call to the subscriber's main published line;

(iv) means for selectively processing an incoming call to an available additional line or if there is no available additional line to either the main published line or to send a "busy" signal to the caller; and (v) means for adjusting the timing of the DTMF to enable the apparatus to operate with different central offices.

3. The invention of claim 2 wherein means are provided for verifying the adjustment of the DTMF.

4. A telephone system having a call pickup feature in the central office of a telephone company (CO) and a key service unit (KSU) on a telephone subscriber's premises, the KSU having a main published line (MPL) on one circuit and at least one additional line on another circuit and all of the operable circuits in the subscriber's KSU being operably connected to the call pickup feature and in the same pickup group wherein the call pickup feature is accessible by the subscriber signaling the dialing sequence of the pickup code such as *8 to the central office and wherein the improvement comprises an apparatus on the subscriber's premises, said apparatus including:

(a) a hunting simulator and the hunting simulator comprising:

(i) means for connecting one circuit for the subscriber's MPL from the telephone company first to the hunting simulator and then to the KSU;

(ii) means for connecting the subscriber's other circuits for the subscribers telephone lines from the telephone company first to the hunting simulator and then to the KSU;

(iii) means for receiving an incoming call on the one circuit for the subscriber's MPL;

(iv) means for selectively processing an incoming call on the one circuit for the subscriber's MPL to an available line on the subscriber's other circuits or if there is no available line to either process the incoming call to the MPL or send a "busy" signal to the caller;

(b) said means for selectively processing an incoming call on the one circuit for the subscriber's MPL to an available line on the subscriber's other circuits including:

(i) a programmed CPU;
(ii) means responsive to an incoming call for activating the CPU; and
(iii) the CPU being programmed to locate an open circuit
(iv) means for separating the CO circuit and the KSU circuit;
(v) means for identifying the dial tone on the separated CO circuit;
(vi) means for verifying the dial tone on the separated CO circuit;
(vii) means responsive to verification of the dial tone for connecting the KSU circuit and the CO circuit; and
(viii) means to signal the dialing sequence of the pickup code.

5. In a telephone subscriber's private telephone system having a key service unit (KSU) with a main published line (MPL) from the central office of a telephone company (CO) on one circuit (the CO circuit) and at least one additional line on another circuit (the KSU circuit) operably connected to the call pick-up feature and in the same pick-up group of a CO that normally requires the subscriber to manually dial the sequence of the pick-up code (*8, for example) to process an incoming call to an available line, the method of automatically locating an open circuit and activating the dialing sequence of the pickup code in response to an incoming call on the subscribers MPL, said method comprising the steps of:

(a) providing a hunting simulator on the subscriber's premises operably connected between the CO and the subscriber's KSU and including a CPU programmed for the hunting simulator to take the following steps in response to an incoming call:
(i) recognize an incoming call on the MPL;
(ii) select an available line on another circuit;
(iii) separate the CO circuit from the KSU circuit;
(iv) identify the dial tone of the available line on the CO circuit;
(v) cause the KSU circuit to ring the available line;
(vi) sense an off-hook condition when the subscriber picks up the phone to answer the incoming call;
(vii) notify the CPU of the off-hook condition;
(viii) verify the dial tone of the available line;
(ix) reconnect the CO circuit with the KSU circuit; and
(x) activate the dialing sequence of the pick-up code.

* * * * *